US012806585B2

(12) United States Patent
Hoffmann

(10) Patent No.: US 12,806,585 B2
(45) Date of Patent: Nov. 24, 2026

(54) MIXING BLADE FOR MIXER

(71) Applicant: AARON ENGINEERED PROCESS EQUIPMENT, INC., Wood Dale, IL (US)

(72) Inventor: Jeffrey R. Hoffmann, Bull Valley, IL (US)

(73) Assignee: Aaron Engineered Process Equipment, Inc., Wood Dale, IL (US)

( * ) Notice: Subject to any disclaimer, the term of this patent is extended or adjusted under 35 U.S.C. 154(b) by 486 days.

(21) Appl. No.: 18/422,559

(22) Filed: Jan. 25, 2024

(65) Prior Publication Data

US 2025/0242316 A1 Jul. 31, 2025

(51) Int. Cl.

| | |
|---|---|
| ***B01F 27/00*** | (2022.01) |
| ***B01F 27/053*** | (2022.01) |
| ***B01F 27/072*** | (2022.01) |
| ***B01F 27/1125*** | (2022.01) |

(52) U.S. Cl.

CPC ........ *B01F 27/0724* (2022.01); *B01F 27/053* (2022.01); *B01F 27/11252* (2022.01)

(58) Field of Classification Search

CPC .............. B01F 27/0724; B01F 27/0726; B01F 27/1125; B01F 27/053

See application file for complete search history.

(56) References Cited

U.S. PATENT DOCUMENTS

| | | | | |
|---|---|---|---|---|
| 3,908,032 A * | 9/1975 | Didelot | ................ | A23G 3/0205 426/660 |
| 2021/0121837 A1* | 4/2021 | Ostvik | .................. | B01F 27/051 |

* cited by examiner

*Primary Examiner* — Anshu Bhatia

(74) *Attorney, Agent, or Firm* — Barnes & Thornburg LLP; G. Peter Nichols

(57) ABSTRACT

A mixing blade includes a first end of the blade having a first face and a second end of the blade opposite the first end of the blade and having a second face. A first blade face and a second blade face are disposed between the first end and second end. A first end cap that has an outer face and an inner face with the inner face abutting the first face of the first end of the blade. A second end cap that has an outer face and an inner face with the inner face abutting the first face of the second end of the blade.

11 Claims, 3 Drawing Sheets

MIXING BLADE FOR MIXER

The present disclosure describes an improved mixing blade for a mixer and a method of making such an improved mixing blade.

BACKGROUND

Mixing blades for mixing all manner of materials are known. For example, double arm mixers of which sigma blade mixers are one type, are typically used for mixing high viscosity materials such as doughs, chewing gum base, rubbers including silicone rubber, butyl rubber and the like. Depending on the size of the mixer, the mixing blade may have a length of, for example 8-10 feet and may weigh on the order of 6,000 to 8,000 pounds. As such, the mixing blade is formed by casting carbon steel or casting stainless steel.

In many applications, the mixing of the material is desirably conducted at temperatures greater than room temperature. However, because of the size and weight of the blade, it requires a significant amount of energy and time to heat the blade (e.g., 24 or more hours) and vessel and thus, the mixture to the desired temperature.

To address that issue, an internal passageway may be formed within the blade to allow pressurized and heated fluid, e.g., oil or a mixture of water and a heat transfer fluid such as a glycol, to pass through to heat the blade. With such a passageway the time to heat the blade to the desired temperature may be reduced to about one hour.

While such mixing blades are useful and beneficial, it has been found that because the blade is formed from a casting of carbon steel or stainless steel, there is a certain amount of porosity throughout the blade. This inherent porosity provides a pathway of the heated fluid from the internal passageway to the surface of the blade, resulting in the egress of the heated fluid and contamination of the material that is being mixed in the vessel. Moreover, it has been found that this issue is exacerbated by the necessary machining of the ends of the blade, which may open or create new pathways for the heated fluid from the internal passageway to the machined ends of the blade. To date, when the source of a leak of the fluid from the passageway has been identified, the blade is repaired "in-place", i.e., without removing the blade from the mixing vessel. The repair is usually effected by welding the surface of the blade at the egress location and then machining to render the welded surface portion smooth.

Unfortunately, when the end of the blade contains an egress location, the blade cannot be repaired "in-place" because of its location within the mixer vessel, e.g., the end of the blade is spaced the end wall of the vessel a distance of less than one inch and oftentimes spaced from the end wall about 0.125 inches. As a result, the blade must be removed from the mixer vessel in order to effect a repair. But, due to the size, weight, and interconnection of the blade with respect to other portions of the mixer, it is difficult and very time consuming to remove the blade from the mixer vessel to repair an end of the blade.

To address this issue, the inventor created an improved mixing blade and a method of making the improved mixing blade.

SUMMARY

In one aspect, a mixing blade includes a first end of the blade having a first face and a second end of the blade opposite the first end of the blade and having a second face. A first blade face and a second blade face are disposed between the first end and second end. A first end cap that has an outer face and an inner face with the inner face abutting the first face of the first end of the blade. A second end cap that has an outer face and an inner face with the inner face abutting the first face of the second end of the blade.

DESCRIPTION

It is to be understood by one of ordinary skill in the art that the present discussion is a description of specific embodiments only and is not intended to limit the broader aspects of the described apparatus.

Figure 1:
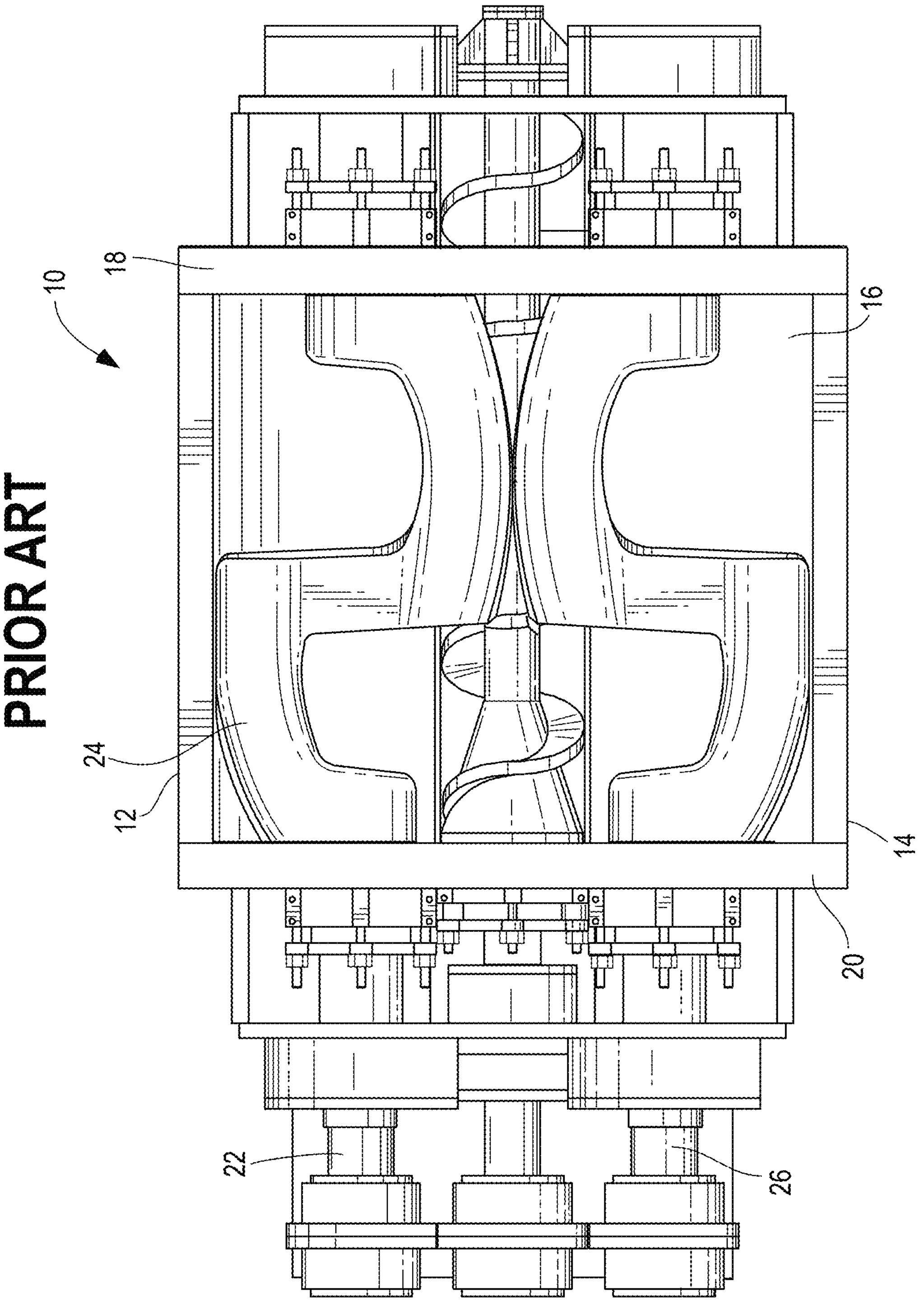
FIG. 1 PRIOR ART
FIG. 1 is a top plan view of a prior art double arm mixer extruder with two mixing blades and a discharge screw and with a top portion of the mixer being removed to show other portions of the mixer.

Turning to FIG. 1, a top view of a prior art mixer extruder is shown. This particular mixer extruder is a double arm mixer extruder (may also be referred to as a sigma blade mixer extruder) Typical of such a mixer extruder, there is a container, tank or vessel 10 with an opening at the top (not shown), a first end wall 18 and a second end wall 20 spaced from and parallel to the first end wall 18, a first side wall 12 and a second side wall 14 spaced from and parallel to the first side wall 12. The tank has an opening on the top surface for loading the material into the tank, and the opening is typically closed by a lid (not shown).

The vessel is shown as having a first 24 mixing blade and a second mixing blade 28. Each are rotatably supported at each end by a respective stub shaft that extends through each respective end wall (the first and second end walls) of the tank. For each blade 24, 28, one of the respective stub shafts 22, 26 is connected to a motor to drive the respective mixing blade 24, 28. Each mixing blade, e.g., a sigma blade (may also be referred to as the blade), typically has a geometry and profile so that the mass of material within the vessel is pulled, sheared, compressed, kneaded, and folded by the action of the two mixing blades, against the walls of the tank.

While the following description may refer to a specific mixing blade, e.g., a sigma blade, it will be appreciated by the skilled artisan that the described improved mixing blade may be suitable for any type of mixing blade, although it appears to be particularly beneficial for sigma blades due to the type of mixing applications for which sigma blades are used.

Typically, sigma blades are casted (e.g., sand casted) from carbon steel or stainless steel and therefore have a small amount of porosity throughout the entire blade resulting from the casting process. Each blade 100 includes a first end 110, a first blade face 120, a central section 130, a second blade face 140, and a second end 110, with the first blade face 120 being connected to the second blade face 140 by the central section 130. The first blade face 120 is generally opposite or facing 180° from the second blade face 140. In other words, if the first blade face 120 is facing upward, e.g. at the 12 o'clock position, the second blade face 140 will be facing downward, e.g., at the 6 o'clock position.

Figure 2:
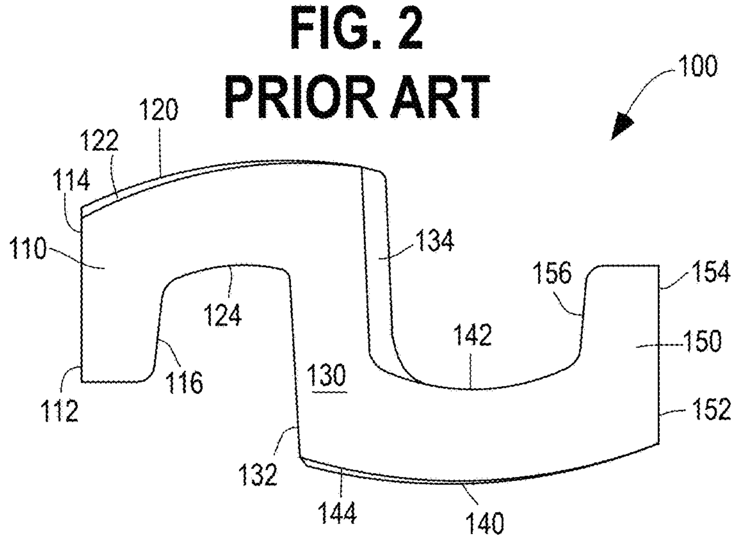
FIG. 2 PRIOR ART
FIG. 2 is a view of a prior art mixing blade.
Figure 3:
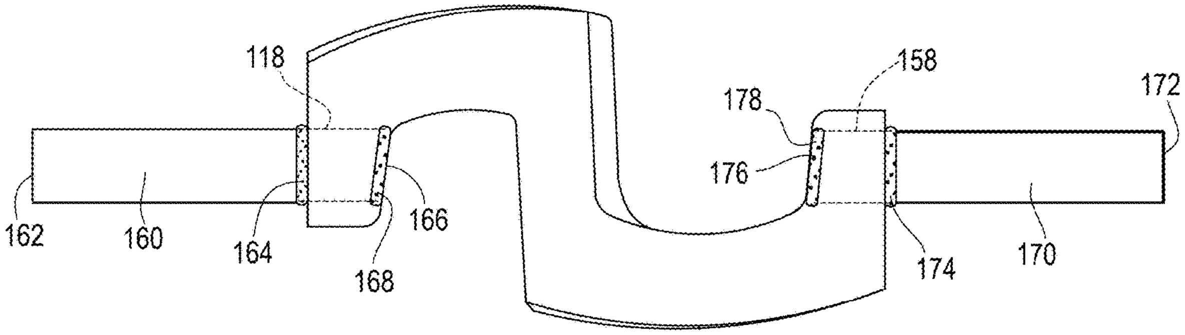
FIG. 3 PRIOR ART
FIG. 3 is a view of a prior art mixing blade in which stub shafts have been inserted into each end of the blade and welded at the end surface of the blade to secure each stub shaft in place.

Referring to FIGS. 2 and 3, after the mixing blade 100 is formed, the first end 110 of the mixing blade is bored to form a first through hole (or bore) 118. The first through hole 118 extends from the first face (outer face) 112 of the first end of the blade 110 to the second face (inner face) 116 of the first end of the blade 110. Similarly, the second end of the mixing blade 150 is bored to form a second through hole (or bore) 158. The second through hole 158 extends from the first face (outer face) 152 of the second end of the blade 150 to the second face (inner face) 156 of the second end of the blade 150.

At the first end of the blade 110, a first stub shaft 160 is inserted into and through the first bore 118 so that the distal end 166 of the first stub shaft 160 is substantially coterminous with the second or proximal face 116 of the first end of the blade 110, i.e., the second face 116 of the first end of the blade 110. A weld 168 is applied about the periphery of the first stub shaft 160 at the juncture of the distal end 166 of the first stub shaft 160 and the proximal end 116 of the first blade end 110, i.e., the second face 116 of the first end of the blade 110. A weld 164 is also applied about the periphery of the first stub shaft 160 at the juncture of the first stub shaft 160 and the distal end 112 of the first blade end, i.e., the outer face 112 of the first blade end 110.

Similarly, at the second end of the blade 150, a second stub shaft 170 is inserted through the second bore 158 so that the distal end 176 of the second stub shaft 170 is substantially coterminous with the proximal end 156 of the second end of the blade 150, i.e., the second face 156 of the second end of the blade 150. A weld 178 is applied about the periphery of the second stub shaft '70 at the juncture of the distal end 176 of the second stub shaft 170 and the proximal end 156 of the second blade end 150, i.e., the second face 156 of the second end of the blade 150. A weld 174 is applied about the periphery of the second stub shaft 170 at the juncture of the second stub shaft 170 and the distal end 152 of the second blade end 150, i.e., the outer face 152 of the second end of the blade 150.

The above process can be repeated for each blade to be installed in the mixer. For example, with respect to the mixer shown in FIG. 1, there are two mixing blades and thus, the above process will be conducted for each blade.

After the first and second stub shafts 160, 170 are secured to the first and second ends of the blade 110,150, respectively, the assembly (i.e., the blade and shafts) may be turned between centers on a lathe so that the first and second stub shafts 160, 170 are concentric, i.e., so that the first and second stub shafts 160, 170 are aligned on the same center axis.

It will be appreciated that the first and second stub shafts 160, 170 lie in substantially the same plane, i.e., substantially the same longitudinal plane. With this in mind and referring to FIG. 2, it will be appreciated that the outer face of the first and second ends of the blade 112, 152 (may also be referred to as the first face of the first and second ends of the blade, respectively) are generally perpendicular to a longitudinal line passing through the center axis of the first and second sub shaft 160, 170. It will also be appreciated that the central section 130 of the blade is generally parallel with the outer face 112, 152 of the first and second ends 110, 150 of the blade and therefore, the first and second blade faces 120, 140 are generally perpendicular to the central section 130 and the outer face 112, 152, of the first and second ends of the blade 110, 150.

Figure 4:
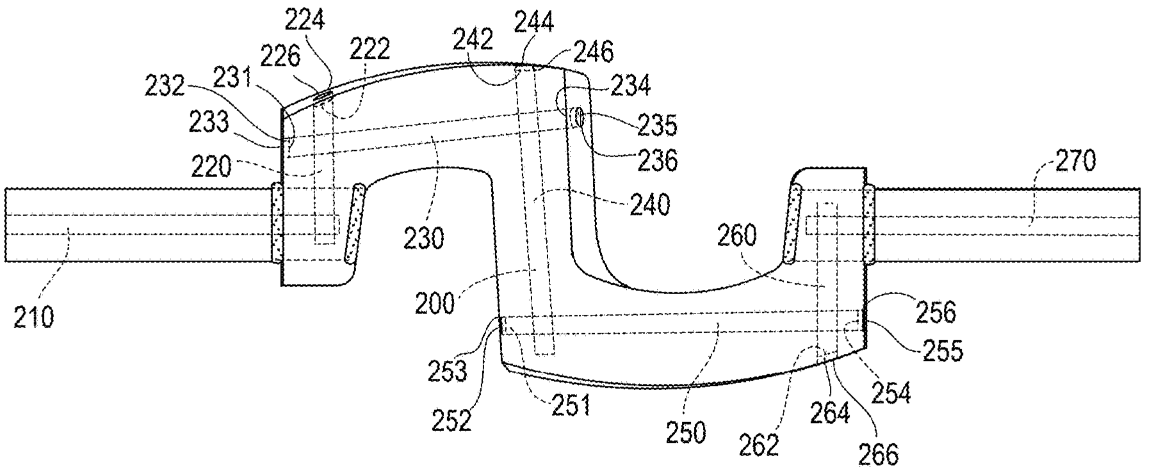
FIG. 4 PRIOR ART
FIG. 4 is a view of a prior art mixing blade that has been cored to provide an internal passageway for the flow of fluid. It also shows where the ends of certain passages have been welded closed.

Referring to FIG. 4, to create the cored mixing blade having an internal passageway 200, intersecting bore holes are created in the first and second stub shaft 160, 170 and in the body of the blade 100 to define a passageway 200 for the flow of fluid. Put another way, the first end 110 of the blade is in fluid communication with the second end 150 of the blade by virtue of the passageway 200.

While the passageway 200 may be created in many differing ways and by many differing means, the following describes one manner of creating the passageway. A first longitudinal bore hole 210 is created in the first stub shaft 160 generally along its central axis from its first of proximal end 162 toward but not through its second or distal end 166. In other words, the first stub shaft 160 may be generally cylindrically shaped and the first longitudinal bore hole 210 may be located at the center axis of the first stub shaft 160 and may extend from a first end (proximal end) 162 of the first stub shaft 160 toward a second end (distal end) 166 of the first stub shaft 160. As noted, the first longitudinal bore 210 does not extend the entire distance (length) of the first stub shaft 160, but extends at least to the location of the center of the first end 110 of the blade, i.e., the midpoint between the outer face 112 and the inner face 116 of the first end 110 of the blade 100.

A first intersecting bore hole 220 may be created on the first blade face 120 adjacent the outer face 112 of the first end 110 of the blade so that the first intersecting bore hole 220 intersects the first longitudinal bore 210 at an angle between about 80° and about 100°. Accordingly, the first intersecting bore hole 220 is generally parallel to the outer face 112 of the first end 110 of the blade. The first intersecting bore hole 220 passes through the first longitudinal bore 210 and terminates, i.e., dead ends, at a location just beyond the periphery of the longitudinal bore hole 212. It will be appreciated that the first intersecting bore hole 220 does not extend through the entire diameter (width) of the first stub shaft 160.

A second intersecting bore hole 230 is created generally orthogonal to the first intersecting bore hole 220. The second intersecting bore hole 230 extends from the outer face 112 of the first end 110 of the blade to a second face 134 of the central section 130 and is generally parallel to the first blade face 120. Adjacent a first end 231 of the second intersecting bore hole 230, the second intersecting bore hole 230 intersects the first intersecting bore hole 220 at an angle between about 80° and about 100°. Adjacent a second end 234 of the second intersecting bore hole 230, the second intersecting bore hole 230 intersects a third intersecting bore hole 240 an angle between about 80° and about 100°.

In this regard, a third intersecting bore hole 240 is created on the first blade face 120 adjacent the second face 134 of the central section 130. The third intersecting bore hole 240 extends from the first blade face 120 toward, but not to or through, the second blade face 140 to intersect with a fourth intersecting bore hole 250 at an angle between about 80° and about 100°. The third intersecting bore 240 is generally parallel to the first 132 and second face 134 of the central section 130 (as well as the first 112 and second face 152 of the first and second ends 110, 150, respectively, of the blade).

As noted above, a fourth intersecting bore hole 250 is created orthogonal to the third intersecting bore hole 240. The fourth intersecting bore hole 250 extends from the outer face 152 of the second end 150 of the blade to a first face 132 of the central section 130 and is generally parallel to the second blade face 140. A fifth intersecting bore hole 260 is created on the second blade face 140 adjacent the outer face 152 of the second end 150 of the blade so that the fifth intersecting bore hole 260 intersects the fourth intersecting bore hole 240 at an angle between about 80° and about 100°. Accordingly, the fifth intersecting bore 260 is generally parallel to the outer face 152 of the second end 150 of the blade. The fifth intersecting bore hole 260 extends from the second blade face 140 toward the second stub shaft 170 in a direction generally parallel with the outer face 152 of the second end 150 of the blade.

It will be appreciated that after each of the bore holes are created, there will be openings on the outer face of first end of the blade, on the face of the first blade face, on the first and second faces of the central section, on the face of the second blade face, and on the outer face of the second of the blade. These openings may be closed by, for example, using a weld plug 226, 236, 246, 256, 266 that is inserted, welded, and then machined to form a smooth surface. After closing the noted openings, it will be appreciated that a continuous passageway 200 is created from the first or proximal end 162 of the first stub shaft 160, through the blade 100 and out and through the first or proximal end 172 of the second stub shaft 170.

As a result, fluid, which may be pressurized, may be delivered to the passageway to heat up or cool down the blade as desired. In that regard, the fluid may be any suitable fluid that can withstand anticipated temperatures from about 0 °C to about 300 °C and anticipated pressures from about 1 psig to about 100 psig. Suitable examples of such fluids are oils and glycol based coolants and the like.

Further, while the creation of the intersecting bores have been described in the above order, it will be appreciated that they could be created in any particular order so long as, after they are created, a continuous passageway providing continuous fluid communication exists from the proximal end 162 of the first stub shaft 160 through the blade and out through the proximal end 172 of the second stub shaft 170. Similarly, the open holes at the surface of the blade may be plug welded in any particular order so that each of the created bore openings in the blade are sealed.

Before or after turning the assembly, the first end face 112, 152 of the first and second ends 110, 150 of the blade, as well as each weld plug are machined to provide a smooth surface.

Figure 5:
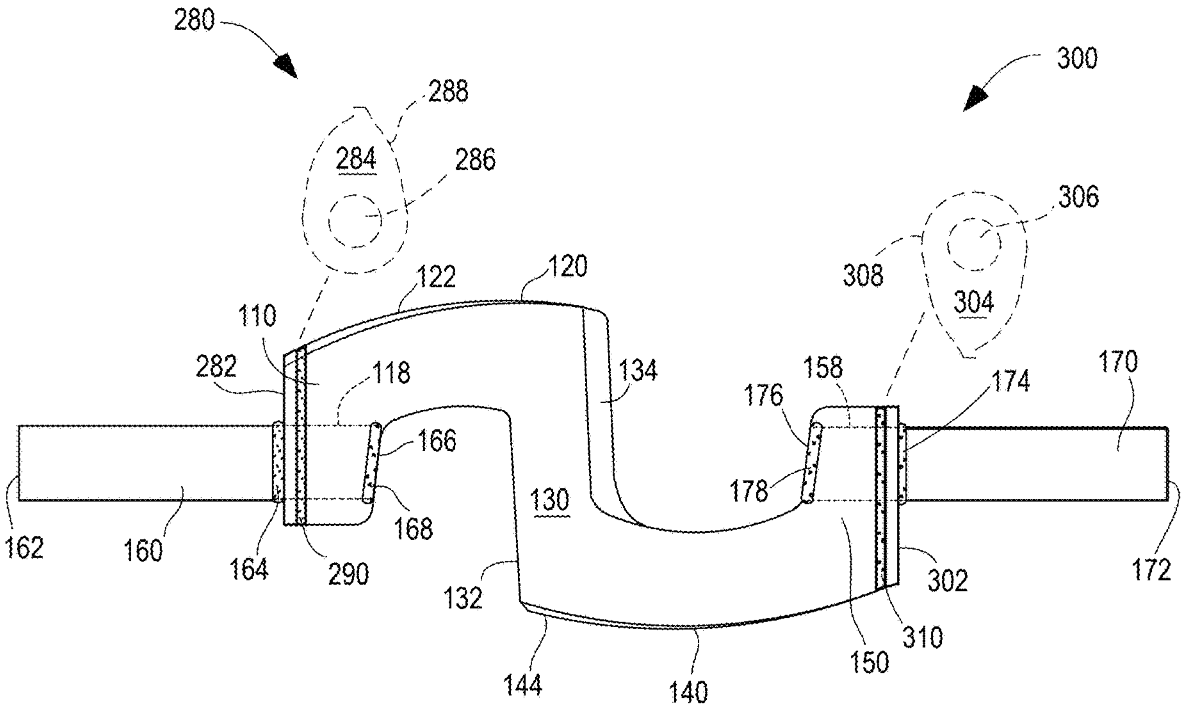
FIG. 5 shows one embodiment of the mixing blade according to the present invention in which the end caps are shown in a rotated exploded view.

With the above in mind and referring to FIG. 5, one embodiment of an end capped mixing blade is described. The mixing blade is the same as that described in connection with FIG. 1 and may be a sigma blade. To that end, the mixing blade 100 is formed from cast carbon steel or cast stainless and, after the blade is cast, each outer face 112, 152 of the first 110 and second end 150 may be machined to provide a smooth face.

A first and second plate is cut (e.g., plasma cut) to conform to the cross-sectional shape of the outer face of the first 112 and second 152 end of the blade, respectively, to define a first 280 and second end cap 300. Put another way, the outer periphery of the first 280 and second end cap 300 are coterminous with the outer periphery of the first 112 and second 152 outer faces of the ends 110, 150 of the blade, respectively. A through hole may be cut within the body of the first and second end cap, respectively 286, 306, so that each through hole 286, 306 is coextensive with the bore hole 118, 158 provided at the first 110 and second end 150 of the blade. Alternatively, it is contemplated that the first and second end cap 280, 300 are provided without a through hole 286, 306 prior to securing the first and second end cap 280, 300 to the first faces 112, 152 of the first 110 and second 150 ends of the blade, respectively.

The first and second end cap 280, 300 may have a thickness between about 0.125 inches and about 1 inch or about 0.25 inches to about 0.75 inches or about 0.375 inches to about 0.75 inches, or any range between about 0.125 inches and about 1 inch. In addition, it is desirable if the first and second end cap 280, 300 are formed from a material that differs from that of the blade. As such, it may be desirable if the first and second end cap 280, 300 are made of a material that is less porous than that of the blade. In this regard, it is contemplated that the first and second end cap 280, 300 are formed from hot or cold rolled steel.

The first end cap 280 has an outer face 282, and an inner face 284. Similarly, the second end cap 300 has an outer face 302 and an inner face 304. The inner face of each 302, 304 of the first 280 and second end cap 300 abut the outer face 112, 152, of the first and second ends of the blade 110, 150, respectively. The first and second end caps 280, 300 are secured to each of the outer face 112, 152, of the first and second ends of the blade 110, 150, respectively. In one instance, the first and second end caps 280, 300 are welded about their periphery 288, 308, respectively to the outer periphery 114, 154 of the outer face 112, 152 of the first and second ends of the blade 110, 150, respectively, to securely join each end cap 280, 300 to the outer face 112, 152 of each end of the blade 110, 150. The areas that have been welded may be machined to provide a smooth surface.

It will be appreciated that, by providing a rolled steel end cap that is secured to the outer face ends of the blade, the egress of fluid from the passageway past the outer face 282, 302 of each end cap, which is secured to the outer face 112, 152 of the first and second end 110, 150 of the blade, will be significantly inhibited if not altogether eliminated since it is known that the porosity of rolled steel is significantly less than that of cast carbon steel or stainless steel, even if the outer face of the end cap is machined.

After the end caps 280, 300 have been secured to each outer face 112, 152 of the first and second end 110, 150 of the blade, each end cap 280, 300 and each end of the blade 110, 150 may be bored to provide a through hole 118, 286, 158, 306 for the first and second stub shaft 160, 170 as described above. Alternatively, it is contemplated that a through hole 286, 306 may be cut within the body of the first and second end cap 280, 300 at a time other than when the through hole 118, 158 is created at the first and second end 110, 150 of the blade. In this instance, the through hole of the first and second end cap 286, 306 is coextensive with the bore hole 118, 158 provided at the first and second 110, 150 end of the blade, respectively. Thereafter, the first and second stub shafts 160, 170 are inserted into the respective through holes 118, 286, 158, 306.

After the through holes 118, 286, are created, at the first end 110 of the blade, a first stub shaft 160 is inserted through the first bore holes 118, 286 so that the distal end 166 of the first stub shaft 160 is substantially coterminous with the proximal end 116 of the first end 110 of the blade, i.e., the second face 116 of the first end 110 of the blade. A weld 168 is applied about the periphery of the first stub shaft 160 at the juncture of the distal end 166 of the first stub shaft 160 and the proximal end 116 of the first blade end, i.e., the second face 116 of the first end 110 of the blade. A weld 166 is also applied about the periphery of the first stub shaft 160 at the juncture of the first stub shaft 160 and the distal end 112 of the first blade end 110, i.e., the outer face 112 of the first blade end 110.

Similarly, at the second end 150 of the blade, a second stub shaft 170 is inserted through the second bore 306, 158 so that the distal end 176 of the second stub shaft 170 is substantially coterminous with the proximal end 154 of the second end 150 of the blade, i.e., the second face 154 of the second end 150 of the blade. A weld 174 is applied about the periphery of the second stub shaft at the juncture of the second stub shaft 170 and the proximal end 154 of the second blade end 150, i.e., the second face 154 of the second end 150 of the blade. A weld 176 is also applied about the periphery of the second stub shaft at the juncture of the second stub shaft 170 and the distal end 152 of the second blade end 150, i.e., the outer face 152 of the second end 150 of the blade.

The above process can be repeated for each blade to be installed in the mixer. For example, with respect to the mixer shown in FIG. 1, there are two mixing blades and thus, the above process will be conducted for each blade.

It will be appreciated that the above describes an exemplary method and to that end the second stub shaft 170 could be inserted into the second bore 158, 306 prior to the first stub shaft 160 being inserted into the first bore 118, 286. Also, both stub shafts 160, 170 could be inserted into each of their respective bores and then each could be welded, as described above.

After the first and second stub shafts 160, 170 are secured to the first and second ends 110, 150 of the blade, respectively, the assembly (i.e., the blade and shafts) may be turned between centers on a lathe so that the first and second stub shafts 160, 170 are concentric, i.e., so that the first and second stub shafts 160, 170 are aligned on the same center axis.

It will be appreciated that the first and second stub shafts 160, 170 lie in substantially the same plane, i.e., substantially the same longitudinal plane. With this in mind and referring to FIG. 5, it will be appreciated that the outer faces 112, 152 of the first and second ends 110, 150 of the blade (may also be referred to as the first face of the first and second ends of the blade, respectively) are generally perpendicular to a longitudinal line passing through the center axis of the first and second stub shaft 160, 170. It will also be appreciated that the central section 130 of the blade is generally parallel with the outer faces 112, 152 of the first and second ends 110, 150 of the blade and therefore, the first and second blade faces 120, 140 are generally perpendicular to the central section 130, and the outer faces 112, 152 of the first and second ends 110, 150 of the blade.

Figure 6:
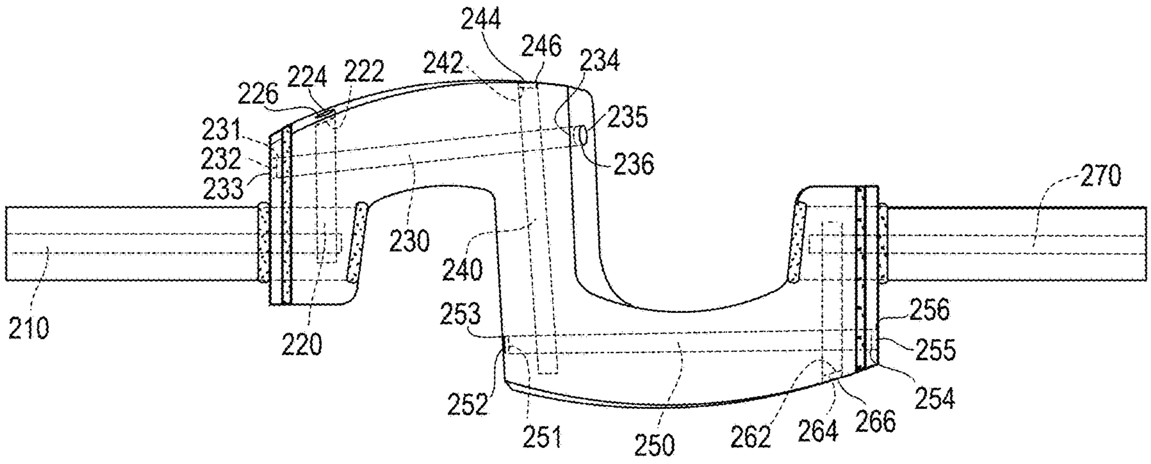
FIG. 6 is a view of the mixing blade of FIG. 5 in which stub shafts have been inserted into each end of the blade and welded at the outer surface of each end cap to secure each stub shaft in place and with the blade being cored to provide an internal passageway for the flow of fluid. It also shows where the ends of certain passages have been welded closed.

Referring to FIG. 6, to create the improved cored mixing blade, to create the cored mixing blade having an internal passageway 200, intersecting bore holes are created in the first and second stub shaft 160, 170 and in the body of the blade 100 to define a passageway 200 for the flow of fluid. Put another way, the first end 110 of the blade is in fluid communication with the second end 150 of the blade by virtue of the passageway 200.

While the passageway 200 may be created in many differing ways and by many differing means, the following describes one manner of creating the passageway. A first longitudinal bore hole 210 is created in the first stub shaft 160 generally along its central axis from its first of proximal end 162 toward but not through its second or distal end 166. In other words, the first stub shaft 160 may be generally cylindrically shaped and the first longitudinal bore hole 210 may be located at the center axis of the first stub shaft 160 and may extend from a first end (proximal end) 162 of the first stub shaft 160 toward a second end (distal end) 166 of the first stub shaft 160. As noted, the first longitudinal bore 210 does not extend the entire distance (length) of the first stub shaft 160, but extends at least to the location of the center of the first end 110 of the blade, i.e., the midpoint between the outer face 112 and the inner face 116 of the first end 110 of the blade 100.

A first intersecting bore hole 220 may be created on the first blade face 120 adjacent the outer face 112 of the first end 110 of the blade so that the first intersecting bore hole 220 intersects the first longitudinal bore 210 at an angle between about 80° and about 100°. Accordingly, the first intersecting bore hole 220 is generally parallel to the outer face 112 of the first end 110 of the blade. The first intersecting bore hole 220 passes through the first longitudinal bore 210 and terminates, i.e., dead ends, at a location just beyond the periphery of the longitudinal bore hole 212. It will be appreciated that the first intersecting bore hole 220 does not extend through the entire diameter (width) of the first stub shaft 160.

A second intersecting bore hole 230 is created generally orthogonal to the first intersecting bore hole 220. The second intersecting bore hole 230 extends from the outer face 112 of the first end 110 of the blade to a second face 134 of the central section 130 and is generally parallel to the first blade face 120. Adjacent a first end 231 of the second intersecting bore hole 230, the second intersecting bore hole 230 intersects the first intersecting bore hole 220 at an angle between about 80° and about 100°. Adjacent a second end 234 of the second intersecting bore hole 230, the second intersecting bore hole 230 intersects a third intersecting bore hole 240 an angle between about 80° and about 100°.

In this regard, a third intersecting bore hole 240 is created on the first blade face 120 adjacent the second face 134 of the central section 130. The third intersecting bore hole 240 extends from the first blade face 120 toward, but not to or through, the second blade face 140 to intersect with a fourth intersecting bore hole 250 at an angle between about 80° and about 100°. The third intersecting bore 240 is generally parallel to the first 132 and second face 134 of the central section 130 (as well as the first 112 and second face 152 of the first and second ends 110, 150, respectively, of the blade).

As noted above, a fourth intersecting bore hole 250 is created orthogonal to the third intersecting bore hole 240. The fourth intersecting bore hole 250 extends from the outer face 152 of the second end 150 of the blade to a first face 132 of the central section 130 and is generally parallel to the second blade face 140. A fifth intersecting bore hole 260 is created on the second blade face 140 adjacent the outer face 152 of the second end 150 of the blade so that the fifth intersecting bore hole 260 intersects the fourth intersecting bore hole 240 at an angle between about 80° and about 100°. Accordingly, the fifth intersecting bore 260 is generally parallel to the outer face 152 of the second end 150 of the blade. The fifth intersecting bore hole 260 extends from the second blade face 140 toward the second stub shaft 170 in a direction generally parallel with the outer face 152 of the second end 150 of the blade.

It will be appreciated that after each of the bore holes are created, there will be openings on the outer face of first end of the blade, on the face of the first blade face, on the first and second faces of the central section, on the face of the second blade face, and on the outer face of the second of the blade. These openings may be closed by, for example, using a weld plug 226, 236, 246, 256, 266 that is inserted, welded, and then machined to form a smooth surface. After closing the noted openings, it will be appreciated that a continuous passageway 200 is created from the first or proximal end 162 of the first stub shaft 160, through the blade 100 and out and through the first or proximal end 172 of the second stub shaft 170.

As a result, fluid, which may be pressurized, may be delivered to the passageway to heat up or cool down the blade as desired. In that regard, the fluid may be any suitable fluid that can withstand anticipated temperatures from about 0 °C to about 300 °C and anticipated pressures from about 1 psig to about 100 psig. Suitable examples of such fluids are oils and glycol based coolants and the like.

Further, while the creation of the intersecting bores have been described in the above order, it will be appreciated that they could be created in any particular order so long as, after they are created, a continuous passageway providing continuous fluid communication exists from the proximal end 162 of the first stub shaft 160 through the blade and out through the proximal end 172 of the second stub shaft 170. Similarly, the open holes at the surface of the blade may be plug welded in any particular order so that each of the created bore openings in the blade are sealed.

Before or after turning the assembly, the first end face 112, 152 of the first and second ends 110, 150 of the blade, as well as each weld plug are machined to provide a smooth surface.

Advantageously, the improved mixing blade provides a relatively simple and cost effective method to ameliorate or prevent the deleterious effects that may result from leakage of fluid from the passage way of the cored mixing blade through the ends of the cored mixing blade. In addition, the improved mixing blade will likely significantly reduce or perhaps eliminate the need to remove the mixing blade from the vessel to determine if there is leakage from the passageway to and through the face ends of the mixing blade.

While the concepts of the present disclosure are susceptible of various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A mixing blade for a mixer comprising:
- a first end of the blade having a first end face;
- a second end of the blade opposite the first end of the blade and having a second and face;
- a first blade face and a second blade face disposed between the first end of the blade and the second end of the blade;
- a central section joining the first blade face and the second blade face;
- an internal passageway that extends through the first end face, the first end of the blade, the first blade face, the central section, the second blade face, the second end of the blade, and the second end face;
- a first end cap having an outer face and an inner face, wherein the inner face abuts the first end face of the first end of the blade; and
- a second end cap having an outer face and an inner face, wherein the inner face of the second end cap abuts the second end face of the second end of the blade.

2. The mixing blade of claim 1 wherein a periphery of the first end cap is welded to a periphery of the first end of the blade and wherein a periphery of the second end cap is welded to a periphery of the second end of the blade.

3. The mixing blade of claim 1 wherein the first end cap and the second end cap have a cross sectional shape that is substantially the same as the cross section shape of the first and second end of the blade, respectively.

4. The mixing blade of claim 1 further comprising:
- a first shaft having a first end and a second end, with the second end extending through the first end cap, the first end face of the first end of the blade and to a second face of the first end of the blade; and
- a second shaft having a first end and a second end, with the second end extending through the second end cap, the second and face of the second end of the blade and to a second face of the second end of the blade.

5. The mixing blade of claim 4 wherein the first shaft and the second shaft are concentric.

6. The mixing blade of claim 1 wherein the first end of the blade and the second end of the blade are formed by a first method and the first end cap and the second end cap are formed by a second method, wherein the first method differs from the second method.

7. The mixing blade of claim 6 wherein the first method is cast carbon steel or cast stainless steel.

8. The mixing blade of claim 7 wherein the second method is hot rolled stainless steel or cold rolled stainless steel.

9. The mixing blade of claim 1 wherein the first end of the blade, the first blade face, the second blade face, and the second end of the blade have a porosity that is greater than a porosity of the first and second end cap.

10. The mixing blade of claim 4, wherein the internal passageway extends through the first end cap and the second end cap.

11. The mixing blade of claim 10, wherein the internal passageway extends through the first shaft and the second shaft.

* * * * *